Figure 3:
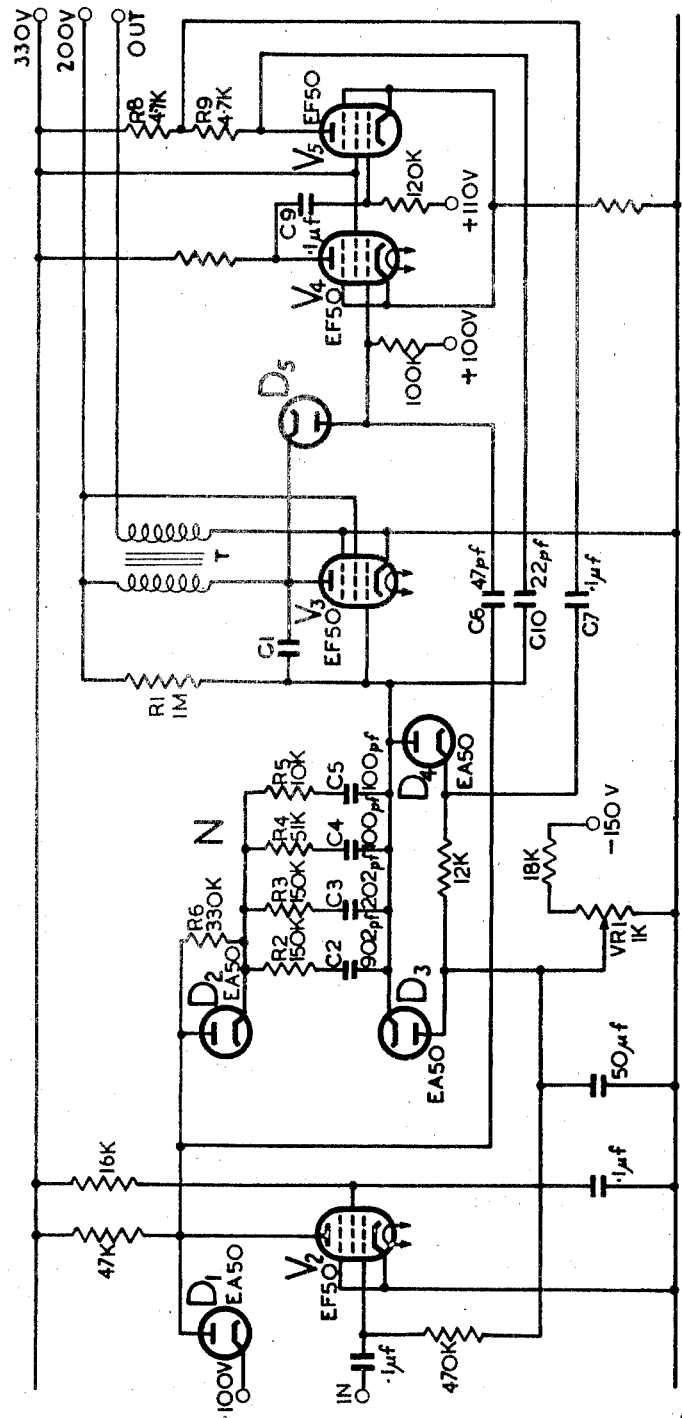

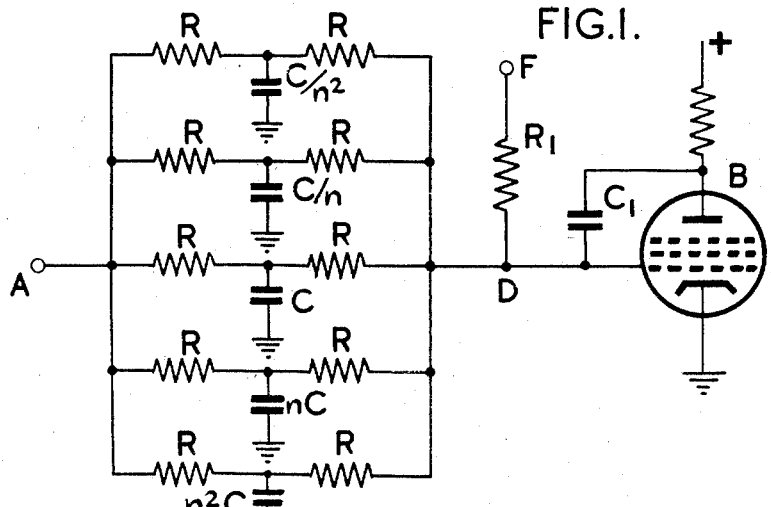
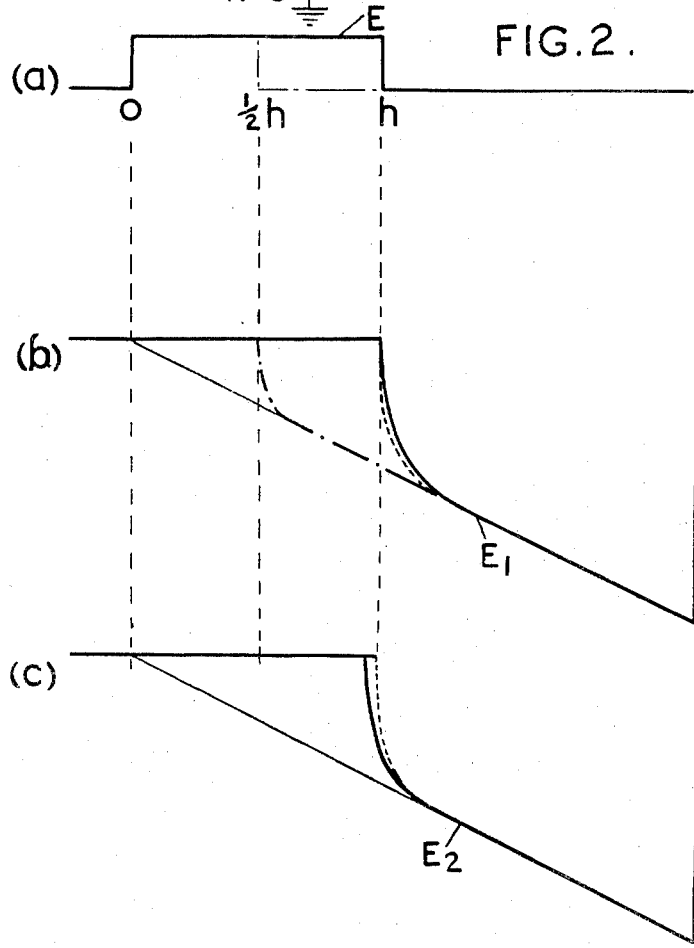

June 5, 1951  F. C. WILLIAMS  2,555,837
TIME BASE CIRCUIT ARRANGEMENT
Filed July 25, 1947  2 Sheets-Sheet 2

F. C. Williams
*Inventor*
By Nelson Moore
*Attorney*

Patented June 5, 1951

2,555,837

UNITED STATES PATENT OFFICE 2,555,837

TIME BASE CIRCUIT ARRANGEMENT

Frederic Calland Williams, Timperley, England
Application July 25, 1947, Serial No. 763,711
In Great Britain March 30, 1945

Section 1, Public Law 690, August 8, 1946
Patent expires March 30, 1965

13 Claims. (Cl. 250—27)

This invention relates to time base circuits and more particularly to a circuit arrangement for producing a non-linear sawtooth voltage wave form of a particular configuration.

The configuration of sawtooth wave sought to be provided is that in which the instantaneous value V of the voltage is required to be related to time $t$ approximately in accordance with the expression—

$$V = K[(h+t)^2 - h^2]^{1/2} \quad (1)$$

for varying values within a predetermined range of the quantity $h$, K being a constant.

The invention is particularly adapted for use in connection with airborne apparatus for giving a map-like display on a cathode ray tube of the terrain below an aircraft through the agency of pulse-modulated radio waves and substantially prevents the distortion experienced with a linear time base due to the variation of slant range with height. When the invention is applied in this manner the quantity $h$ is the height of the aircraft expressed as a fraction of the time taken to receive the first ground echo at a given height.

It is an object of the present invention to provide a circuit arrangement for generating a non-linear sawtooth waveform of the shape set forth for any value within a predetermined range of the quantity $h$ without the necessity for circuit components which require to be varied with said quantity.

According to the invention the shape of the required waveform is approximated by adding a number of exponential terms to a linear sawtooth waveform by means comprising a network of fixed time constant circuits having their time constants related to each other in geometric progression. By arranging for the network to be charged to an extent proportional to $h$, the exponentially varying potential derived by discharging the network, when added to a linearly varying potential, gives a resultant which approximates to the desired form expressed in Equation 1 above. The number of time constant circuits required depends upon the range between the maximum and minimum values of the quantities V, $t$ and $h$ in Equation 1 which it is required to cover and upon the order of accuracy desired. Also, in practice, it is possible to reduce the number of circuits below the theoretical minimum for a given order of accuracy by a slight departure from a true geometric progression, particularly for the values of the end terms of the series.

A theoretical network in accordance with the principle of the invention would require an infinite number of branches but it can be shown that for a given order of accuracy all the circuits having time constants of values outside a certain range may be neglected since they offer a negligible contribution to the result.

Assume that there is a network having branches with the following time constants:

$$\tfrac{1}{32} \quad \tfrac{1}{16} \quad \tfrac{1}{8} \quad \tfrac{1}{4} \quad \tfrac{1}{2} \quad 1 \quad 2 \quad 4 \quad 8 \quad 16 \quad 32$$

unit of time

Then assume that to the order of accuracy required the end terms can be neglected. If such a network is charged for a period of one unit of time the branches having the time constant 1 and near 1 provide the main exponential terms for addition to the linear sawtooth. The other branches contribute exponential terms of progressively less and less amplitude but still in sympathy with the duration of the charging period, since their time constants are in simple proportion thereto.

A corresponding network adapted to charge and discharge in sympathy with a charging period of say 2 units of time would have time constants as follows:

$$\tfrac{1}{16} \quad \tfrac{1}{8} \quad \tfrac{1}{4} \quad \tfrac{1}{2} \quad 1 \quad 2 \quad 4 \quad 8 \quad 16 \quad 32 \quad 64$$

and since by definition the end terms are negligible it becomes apparent that the useful part of the network is contained in the network of the first example.

Again, a network adapted in accordance with the invention to sympathize with a charging period of a ½ unit of time would have the following time constants:

$$\tfrac{1}{64} \quad \tfrac{1}{32} \quad \tfrac{1}{16} \quad \tfrac{1}{8} \quad \tfrac{1}{4} \quad \tfrac{1}{2} \quad 1 \quad 2 \quad 4 \quad 8 \quad 16$$

and the useful part of the network is once more contained in the first network.

Hence, for three distinct charging periods or values of $h$ covering a four to one range the network presents relevant time constants in sympathy with $h$ and the exponential output on discharge is adjusted without the use of variable components. For intermediate values of $h$ it is found that correspondingly appropriate outputs are obtained.

In order that the invention may be more readily understood reference is directed to the accompanying drawing in which—

Fig. 1 is a circuit arrangement in accordance with one practical embodiment of the invention Fig. 2 is a series of waveform diagrams and Fig. 3 is a circuit arrangement in accordance with a further practical embodiment of the invention.

Referring to Fig. 1, the network has five branches and is connected between terminals A and D. Each branch consists of two equal resistances R with a condenser connected between their junction and earth. The condensers are marked $C/n^2$, $C/n$, C, $nC$, $n^2C$ and these symbols are also indicative of their relative capacities which are seen to be in geometric progression. Since all the resistances R are of equal value the time constants of the branch circuits are also related in geometrical progression.

The output terminal D of the network is connected to the control grid of a thermionic valve having a condenser $C_1$ connected between grid and anode to provide negative feed back and a constant voltage is applied to terminal point F, which is connected through a resistance $R_1$ to the terminal point D. Thus the current derived from the network and the constant current through $R_1$ are added.

A square voltage waveform E (Fig. 2(a)) controls the potential of terminal A. For the period o—h during which terminal A is made positive by the applied waveform, the terminal D is clamped to earth potential and the point B is clamped to its normal positive potential by suitable known means not shown.

From the instant O a steady potential E is applied at A. The network charges through the left hand resistances R. Since the terminal D is clamped at earth potential no change occurs in the operating condition of the valve. At the instant h the steady potential ceases, the terminals D and B are unclamped, and as previously stated the exponentially decreasing current derived from the condensers of the network, which lose half their charges to terminal A and half to terminal D through the resistances R, is added to the constant current delivered through $R_1$. The resultant potential $E_1$ at the anode B as shown in full lines in Fig. 2(b) drops rapidly until the condensers are discharged and then becomes linear in time until the end of the time base when the cycle is repeated. This curve is a fair approximation to the ideal curve which is expressed algebraically in Equation 1 above and is represented in broken lines in Fig. 2(b). The corresponding waveforms when the charging time is halved are shown in chain lines.

A nearer approximation to the ideal curve can be achieved by either unclamping terminal B shortly before the instant h or by maintaining the square wave at A shortly after the instant h at which B is unclamped. Either method compensates for the insufficient initial rate of change of voltage at B, which theoretically should be infinite. The result is illustrated in Fig. 2(c) where the actual curve $E_2$ shown in full lines is seen to commence earlier in time than the ideal curve shown in broken lines but it meets the ideal curve sooner than that in Fig. 2(b).

It will be understood that the charge derived from the network and the charge fed through $R_1$ must be correctly related and this is achieved by selecting the ratio $R/R_1$ such that the charge transferred from the network is equal to the charge which would be fed through $R_1$ during the period O—h if D were not clamped to earth potential. In other words the amplitude of the exponential component must be sufficient to shift the linear component negatively so that it slopes from the origin at time O.

It can be shown that the end branches of the network make negligible contribution to the result when the network is charged for a mean period O—h. If h is such that condenser C is 70% charged during this period and n is 2 or greater, then condenser $C/n^2$ becomes sensibly fully charged but contains only $1/.7n^2$ of the charge contained in C. Thus the contribution from $C/n^2$ when the network is fully discharged is relatively small. In the same period condenser $n^2C$ received only about $1/n^2$ of full charge and the fraction of this which it will lose during a time base of duration T is roughly proportional to $T/Rn^2C$ provided $Rn^2C$ is greater than T. Thus the contribution from the end branches are negligible to a given order of accuracy if sufficient branches are used or if n is made large enough.

When the invention is applied to a time base for the cathode ray tube indicator of airborne apparatus of the kind set forth the time base may be triggered by a height marker pulse which occurs when the first ground echo of a transmitted pulse is received. The echo time is a function of the height of the aircraft and immediately precedes the instant at which it is desired to trigger the time base. This is precisely the timing and duration required for the square voltage wave E of the above described embodiment and therefore it may with advantage be arranged for the transmitter pulse to initiate the said square voltage wave and for the height marker pulse to cut it off and to trigger the time base.

Fig. 3 shows a circuit arrangement in accordance with the invention particularly adapted for use as a time base for such airborne apparatus. The network N of the invention consists of the four parallel CR combinations C2R2, C3R3, C4R4, and C5R5. The resistances in this instance are not equal but the time constants of the combinations are in the ratios 1350: 303; 51; 10 respectively, which is substantially a geometric progression. The actual values of all the components are given by way of example on the drawing (Fig. 3). The valve references are those of the Mullard Radio Valve Co. Ltd., England.

Essentially the remainder of the circuit comprises a trigger valve V2, a diode D1 which prevents the anode of V2 and the positive side of the network N from exceeding the potential of 100 volts, a time base valve V3, diode D3 and D4 which hold the grid of V3 and the negative side of the network N at about —5 volts, and a flip-flop circuit comprising valves V4 and V5. In the quiescent condition, valves V2, V3 and V4 are cut-off, V5 is conducting and the network N is charged.

When V2 is turned-on by a positive pulse on its grid, its anode potential falls below 100 volts and the network N discharges through R6 and V2, the amount of the discharge being dependent on the time V2 has been turned-on. Nothing else happens until V2 is turned-off, whereupon its anode voltage and that of the positive side of the network returns to 100 volts. This sudden rise of anode voltage of V2 produces a positive pip at the grid of V4 (via differentiating condenser C6) and the flip-flop flips over to cut-off V5. (The negative pip produced when V2 is turned-on has no effect on the flip-flop.) The consequent rise at the junction of resistances R8 and R9 is transferred via C7 to the cathode of D4 which is thus cut-off leaving the grid of V3 free to rise.

The anode of V3 then starts to run down to provide the time base sweep at a rate determined by the rate at which the feed back condenser C1 is charged. The value of C1 thus determines the scale of the time base and in practice several feed back condensers of differing values with a selector switch may be provided in order to vary the range scale of the display. The resistance R1 charges the said condenser at a linear rate but initially an additional exponentially varying current is transferred from the network N to the condenser C1 thus accelerating the start of the run-down. By arranging for the trigger valve V2 to be turned-on by a positive-going rectangular pulse of amplitude, say, 25 volts and of duration proportional to the height of the aircraft, a time base of the desired form, such as is shown in Fig. 2b, having an amplitude of about 150 volts, is obtained. It is again essential, of course, for the charge derived from the network to be correctly related to the charge derived fed through the resistance R1 and this is achieved by suitably matching said resistance R1 with the resistance R6. A present adjustment for the amount of distortion correction (i. e. the amplitude of the exponential component) introduced is provided by the variable resistance VR1 which adjusts the bias level at which the grid of V3 is clamped by the diodes D3 and D4. With a four branch network as shown it is possible to obtain satisfactory correction at all heights up to 30,000 ft. on time bases representing ranges of up to 25 miles.

Other components of the circuit, not referred to so far, render the action recurrent and afford certain subsidiary refinements as follows:

The anode of a diode D5 is connected to a positive 100 volt source. Hence, when the anode of V3 falls below this potential, D5 conducts and its anode and the grid of V4 fall with the anode of V3. Eventually, V4 is cut-off on its grid and its rising anode voltage is transferred via condenser C9 to the grid of V5 which is thus turned-on hard. The junction of R8 and R9 this time falls and the fall is fed through C7 to the cathode of D4. D4 conducts and brings back the grid of V3 to about −5 volts below which it cannot fall due to D3. V3 is thus cut-off on its grid and its anode flies back to complete the cycle.

In this particular embodiment of the invention the time base waveform is required to control a radial current time base for a magnetically deflected cathode ray tube and therefore an inductive load in the form of a transformer T is provided for the valve V3 so that the flyback overshoots the static voltage level and provides a positive-going half wave which substantially balances the negative-going time base. Also, the current waveform is subsequently resolved into sine and cosine components by means of a rotary transformer (not shown) in order to rotate the radial trace and to compensate for the time lag in the inductive circuits the positive-going rectangular pulses applied to the grid of V2 are timed to start before the transmitter fires and to cease, say, 8–10 $\mu$secs. before the first echo of the transmitted pulse returns from the ground.

Another component not mentioned in the foregoing description is the condenser C10 connected between the grid of V3 and the anode of V5. Its purpose is to insure that the time base starts its run down without delay. When the flip-flop V4, V5 flips over to cut-off V5 the rise at the anode of V5 is differentiated by C10 and appears at the grid of V3 as a positive pip which coincides with the instant of release of the grid and so has the desired effect of initiating the time base.

I claim:

1. A time base circuit arrangement comprising an integrating circuit having an input and an output, a source of direct potential applied to said input whereby a linearly-varying waveform is obtained from said output, a network comprising a plurality of branch circuits each having a reactor-resistance combination of fixed time constant, means for energising said branch circuits, means for discharging energy stored in said branch circuits to produce potentials of decreasing exponential waveforms, and means for applying said exponential waveforms to said input whereby said output waveform is modified.

2. A time base circuit arrangement comprising an integrating circuit having an input and an output, a network comprising a plurality of branches each including a condenser and a resistance, means for applying a rectangular pulse to said network so that said condensers are charged through said resistances, means operative on the termination of said pulse for applying a direct potential to said input whereby a linearly-varying waveform is obtained from said output and for discharging said condensers to produce currents of decreasing exponential waveforms, and means for applying potentials derived from said currents of decreasing exponential waveforms to said input whereby said output waveform is modified by an initial exponential portion.

3. A time base circuit according to claim 2 and in which the means for applying a rectangular pulse to said network comprises a control for adjusting the duration of said rectangular pulse.

4. A time base circuit according to claim 2 and in which the time constants of the condensers and resistances in the branches of the said network are approximately in geometric progression.

5. The method of generating a time base potential for a range indicator which includes generating a first constant potential, holding the time base potential constant for a predetermined time period, generating an exponentially varying potential which begins to so vary at substantially the end of said period, integrating said exponentially varying potential together with the first constant potential to provide an exponentially-varying potential superposed on a linearly-varying potential which latter potential has relatively small change in potential compared to the exponentially varying potential during the first part of the exponential variation and has a relatively large change as compared to the exponentially varying potential during later portions of the exponential variation.

6. The method of claim 5 in which the range is determined by the pulse-echo method and in which the time base potential is held constant for a time period slightly shorter than the period required for the round trip of the pulse-echo.

7. The method of generating a voltage of predetermined waveform which includes generating a first constant potential holding the output potential constant for a predetermined period, at the end of said period generating a second potential changing exponentially, integrating said second potential together with the first constant potential to change the output potential according to the sum of the integrated second and first constant potentials, returning the output potential to said constant value, and repeating the aforementioned steps in the sequence named.

8. The method of generating a voltage of predetermined waveform which includes holding the output potential constant for a predetermined period, generating an exponentially changing potential which starts its changing characteristic substantially at the end of said predetermined period, integrating said exponentially changing potential together with a fixed potential to provide a linearly varying potential superposed on an exponentially varying potential which at first varies at a more rapid rate than the linearly varying potential and later varies only a small amount compared to the linearly varying potential.

9. In a device for generating a predetermined waveform; a source of direct current to energize the device; a network; a three element electron discharge tube having a grid, a plate, and a cathode; a condenser connected between said plate and said grid; a high resistance resistor connected between said source and said grid; said condenser being charged at a substantially linear rate by constant current flow through said resistor; a network connected to said grid; means for variably charging said network and for discharging said network whereby an exponentially decreasing current is applied to said substantially constant current through said resistor; means for impressing a potential derived from said two currents between said grid and cathode; and an output circuit for said tube including means connecting said plate to the positive side of said source and said cathode to the negative side of the source.

10. In a device for generating a predetermined waveform, a source of direct current for energizing the device, a network comprising a plurality of parallel branch circuits each having a different time constant and each having a condenser and a resistor in series, an output circuit, an output tube including a cathode and anode in said output circuit, said tube also including a control grid, a high resistance resistor connected between said grid and the positive side of said source, a condenser connected between said anode and said control grid and arranged to be charged through said resistor at a slow rate compared to the period of the waveform, whereby to effect a substantially linear variation in the potential across said output circuit, means connecting said cathode to the negative side of said source, means for charging said network, a resistor in series with said network and carrying the charge current therefrom, and means connecting the last-named resistor between said grid and said cathode.

11. The device of claim 10 in which the time period of said branches vary substantially in geometric progression.

12. In a time base circuit arrangement, a network comprising a plurality of parallel connected branch circuits each of which circuits include a condenser and a resistance element in series, the condensers and resistance elements in the several circuits having such values that the time constants of the several circuits vary in a geometric progression, a source of high potential direct current, a circuit for charging said network comprising a first resistor having its first side connected to the positive side of said source and its second side connected to a first side of said network, said last-named circuit having another resistor connecting the second side of said network to the negative side of said source, a diode having an anode and a cathode, a wire connecting the anode to the second side of the first resistor, means for applying a positive potential of a value less than the positive potential of said source to the cathode of said diode, a circuit for discharging the network comprising an electron discharge device having a cathode connected to the negatively charged side of said network and an anode connected to the positively charged side, the said electron discharge device having a grid arranged to be triggered by incoming control potentials, a second electron discharge device having a cathode connected to the negative side of said source, said second electron discharge device having an anode and a control grid, a transformer having its primary connected between the last-named anode and the positive side of said source, the secondary of said transformer constituting an output circuit, a wire connecting the last-named grid to the second side of said network, a condenser shunted between the last-named grid and the last-named anode, a high resistance resistor connected from the last-named grid to the positive side of said source, the values of the last-named resistor and the last-named condenser being so related to each other and to the charge rate of said network that the network will affect the last-named grid to a considerably greater extent than said last-named resistor during the first part of the interval of the charge of the network and that the last-named resistor will affect the last-named grid to a considerably greater extent than the network during the latter part of the waveform period, and means for holding the potential of the last-named grid constant during the period that the first-named grid is energized.

13. In a device for generating a predetermined waveform, a network having a plurality of parallel branch circuits each of which circuits include means for storing electricity and each having a different time constant, means for receiving an incoming trigger pulse and for altering the potential across the network to thereby vary the amount of charge, said last-named means including means to permit the network to return exponentially to its quiescent charge value at the end of the period of the trigger pulse, an electron discharge device having an anode and a cathode, a source of direct current across said anode and said cathode, said electron discharge device having a grid, a condenser connected between said anode and said grid, means cooperating with and connected to the first-named means for holding said grid at a predetermined state during the period of the incoming pulse, and means for controlling the potential of said grid after termination of said period comprising means for producing at said anode a linearly varying potential and also producing at said anode, a potential proportional to the value of the current flow through said network.

FREDERIC CALLAND WILLIAMS.

REFERENCES CITED

The following references are of record in the file of this patent:

UNITED STATES PATENTS

| Number | Name | Date |
|---|---|---|
| 2,072,946 | Farnham | Mar. 9, 1937 |
| 2,323,609 | Kihn | July 6, 1943 |
| 2,403,616 | Sanders | July 9, 1946 |
| 2,407,084 | Lavender | Sept. 3, 1946 |
| 2,412,485 | Whiteley | Dec. 10, 1946 |
| 2,430,315 | Varnum | Nov. 4, 1947 |